US008626236B2

(12) United States Patent
Lindner et al.

(10) Patent No.: US 8,626,236 B2
(45) Date of Patent: Jan. 7, 2014

(54) SYSTEM AND METHOD FOR DISPLAYING TEXT IN AUGMENTED REALITY

(75) Inventors: Jeffery Lindner, Waterloo (CA); James Hymel, Waterloo (CA)

(73) Assignee: Blackberry Limited, Waterloo (CA)

( * ) Notice: Subject to any disclaimer, the term of this patent is extended or adjusted under 35 U.S.C. 154(b) by 127 days.

(21) Appl. No.: 12/901,209

(22) Filed: Oct. 8, 2010

(65) Prior Publication Data

US 2012/0088543 A1     Apr. 12, 2012

(51) Int. Cl.
H04M 1/00    (2006.01)
(52) U.S. Cl.
USPC .................. 455/556.1; 382/217; 382/182
(58) Field of Classification Search
USPC .................. 455/556.1; 382/182, 217
See application file for complete search history.

(56) References Cited

U.S. PATENT DOCUMENTS

| | | | |
|---|---|---|---|
| 6,092,906 A | 7/2000 | Olmstead | |
| 6,870,529 B1 | 3/2005 | Davis | |
| 7,305,435 B2 | 12/2007 | Hamynen | |
| 7,672,543 B2 | 3/2010 | Hull et al. | |
| 8,401,335 B2* | 3/2013 | Huang | 382/182 |
| 2006/0013444 A1* | 1/2006 | Kurzweil et al. | 382/114 |
| 2008/0119236 A1 | 5/2008 | Chen et al. | |
| 2008/0317346 A1* | 12/2008 | Taub | 382/182 |
| 2009/0085485 A1 | 4/2009 | Young | |
| 2009/0135333 A1 | 5/2009 | Tai et al. | |
| 2009/0289175 A1 | 11/2009 | Mahowald et al. | |
| 2010/0172590 A1* | 7/2010 | Foehr et al. | 382/217 |
| 2010/0212478 A1* | 8/2010 | Taub et al. | 84/645 |
| 2010/0329555 A1* | 12/2010 | Chapman et al. | 382/167 |

FOREIGN PATENT DOCUMENTS

| | | |
|---|---|---|
| EP | 2144189 A2 | 1/2010 |
| WO | 0246907 A2 | 6/2002 |
| WO | 03032237 A1 | 4/2003 |
| WO | 2008114104 A1 | 9/2008 |

OTHER PUBLICATIONS

ABBYY Fine Reader OCR, document and PDF conversion application—Full Feature List; http://www.abbyyusa.com/finereader/full_feature_list; retrieved from the internet Apr. 16, 2010.
ABBY Product Overview; http://www.abbyy.com/mobileocr/overview/; retrieved from the internet Apr. 16, 2010.

(Continued)

*Primary Examiner* — Vladimir Magloire
(74) *Attorney, Agent, or Firm* — Wilfred P. So; Brett J. Slaney; Blake, Cassels & Graydon LLP.

(57) ABSTRACT

A system and a method are provided for displaying text in low-light environments. An original image of text is captured in a low-light environment using a camera on a mobile device, whereby the imaged text comprising images of characters. A brightness setting and a contrast setting of the original image are adjusted to increase the contrast of the imaged text relative to a background of the original image. Optical character recognition is applied to the adjusted image to generate computer readable text or characters corresponding to each of the imaged text. The original image of text is displayed on the mobile device. The computer readable text is also displayed, overlaid the original image, wherein the computer readable text is aligned with the corresponding imaged text.

22 Claims, 12 Drawing Sheets

(56) References Cited

OTHER PUBLICATIONS

ABBYY OCR and Image Processing; http://www.abbyy.com/support/mobileocr/30/faq/doc_process; accessed Apr. 16, 2010; retrieved from the internet Nov. 16, 2010.

ABBYY Business Card Reader—mobile application for recognition contact information; http://www.abbyy.com/bcr/; retrieved from the internet Apr. 16, 2010.

ABBYY Business Card Reader , Screenshots & Demo; http://www.abbyy.com/bcr/screenshots/; retrieved from the internet Apr. 16, 2010.

ABBYY Foto Translate; http://www.abbyy.com/fototranslate/; retrieved from the internet Apr. 16, 2010.

Samsung announces first cellphone with night vision video; http://dvice.com/archives/2009/07/samsung-announc-1.php; accessed at least as early as Mar. 1, 2010.

ATN: How Night Vision Works—Night Vision Goggles, Night Vision Scopes, Binoculars, Rifelescopes . . . ; http://www.atncorp.com/hownightvisionworks; accessed at least as early as Mar. 1, 2010.

Kuo, S.S., Ranganath, M.V.; "Real time image enhancement for both text and color photo images"; Proceedings of the 1995 International Conference on Image Processing (ICIP95), Washington D.C.; Oct. 23 to 26, 1995; pp. 159 to162; vol. 1; IEEE.

Baumann, S. et al.; "Message Extraction from Printed Documents: A Complete Solution"; Proceedings of the 4th International Conference on Document Analysis and Recognition (ICDAR 97); 1997; pp. 1055 to 1059; IEEE.

Wu, V. et al.: "Automatic Text Detection and Recognition"; Proceedings of Image Understanding Workshop (DARPA97); 1997; pp. 707 to 712.

Papadimitrious, Spiros (spapadim); "WordSnap OCR (Version 43)"; Apr. 3, 2010; http://www.bitquill.net/trac/wiki/Android/OCR?version=43.

Papadimitrious, Spiros (spapadim); "WordSnap OCR"; Aug. 22, 2009; http://www.youtube.com/watch?v=73jqb0EMA4.

Papadimitrious, Spiros (spapadim); "WordSnap OCR—Live Capture"; Aug. 28, 2009; http://www.youtube.com/watch?v=GhuOmn6s.

Papadimitrious, Spiros (spadim); "Mobile OCR input: "Fully automatic" and reality"; Sep. 2009; www.bitquill.net/blog/?m=200909.

Bissacco A. et al.; "Translate the real world with Google Goggles"; May 6, 2010 http://googlemobilt.blogspot.com/2010/05/translate-the-real-world-with-google.html.

Neven, H.; "Integrating translation into Google Goggles"; Feb. 17, 2010; http://googlemobile.blogspot.com/2010/02/integrating-translation-into-google.html.

GoogleVideos: "Translation in Google Goggles Prototype"; Feb. 17, 2010; http://www.youtube.com/watch?v=ae01yz5z99E.

Linder, B.; "Goggle Goggles Android app now translates text"; May 6, 2010; http://www.youtube.com/watch?v=tXcaKPTxQHg.

Kuo, S-S, et al.; "Real Time Image Enhancement for Both Text and Color Photo Images"; Proceedings of the International Conference on Image Processing (ICIP); 1995; Los Alamitos, U.S.A.; Oct. 23, 1995; pp. 159 to 162; vol. 1; IEEE Computer Society Press.

Doermann, D. et al.; "Progress in Camera-Based Document Image Analysis", Proceedings of the Seventh International Conference on Document Analysis and Recognition (ICDAR'03); 2003; Piscataway, NJ, U.S.A.; Aug. 3, 2003; pp. 606-616; IEEE Computer Society Press.

Alecu, Teodor Iulian; Extended European Search Report dated May 18, 2011 from corresponding European Application No. 10187068.1.

Papadimitrious, Spiros (spapadim); "Changes between Version 42 and Version 434 of Android/OCR"; Mar. 4, 2010; http://www.bitquill.net/trac/wiki/Andriod/OCR?action=diff&version=43.

McCollum, A J et al: "A Histogram Modification Unit for Real-Time Image Enhancement", Computer Vision Graphics and Image Processing, vol. 42, No. 1, Apr. 1, 1988, pp. 387-398.

Tae-Chan, Kim et al: "Real-Time Advanced Contrast Enhancement Algorithm" In: "Field Programmable Logic and Application", Jan. 1, 2003, vol. 2869, pp. 691-698.

Christoph H. Lampert And Tim Braun And Adrian Ulges And Daniel Keysers And Thomas M. Breuel: "Oblivious document capture and real-time retrieval", Int'l. Workshop on Camera-Based Document Analysis and Recognition, Jan. 1, 2005.

Jie Zhao et al: "Automatic Digital Image Enhancement for Dark Pictures", Acoustics, Speech and Signal Processing, 2006,Toulouse, France May 14, 2006, p. II.

Kai Wang et al: "Word Spotting in the Wild", European Conference on Computer Vision ECCV 2010, Sep. 5, 2010, pp. 591-604.

Jonghyun Park et al: "Automatic detection and recognition of Korean text in outdoor signboard images", Pattern Recognition Letters, vol. 31, No. 12, Sep. 1, 2010, pp. 1728-1739.

\* cited by examiner

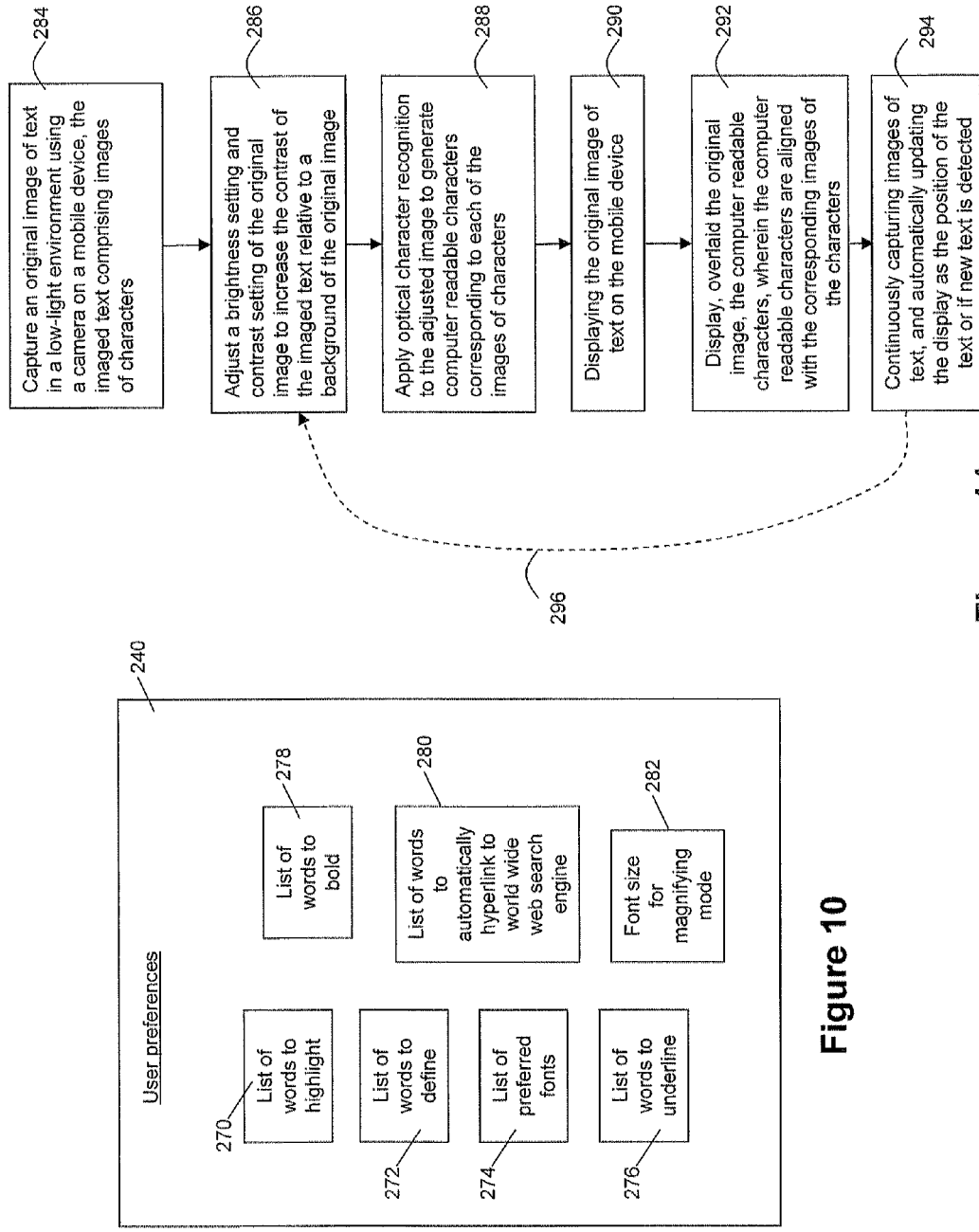

SYSTEM AND METHOD FOR DISPLAYING TEXT IN AUGMENTED REALITY

TECHNICAL FIELD

The following relates generally to viewing and displaying text data (e.g. letters, words, numbers, etc.) using a mobile device.

DESCRIPTION OF THE RELATED ART

Text can be printed or displayed in many media forms such as, for example, books, magazines, newspapers, advertisements, flyers, etc. It is known that text can be scanned using devices, such as scanners. However, scanners are typically large and bulky and cannot be easily transported. Therefore, it is usually inconvenient to scan text at any moment. With developments in camera technology, it is also known that photographs can be scanned for text. However, these photographs are often captured with some delay and the text derived from the photographs usually does not reflect the text currently being viewed by a user.

BRIEF DESCRIPTION OF THE DRAWINGS

Embodiments will now be described by way of example only with reference to the appended drawings wherein:

FIG. 10 is a block diagram of example user preferences shown in FIG. 9.

FIG. 11 is a flow diagram of example computer executable instructions for displaying text in low-light environments.

DETAILED DESCRIPTION

Figure 1:
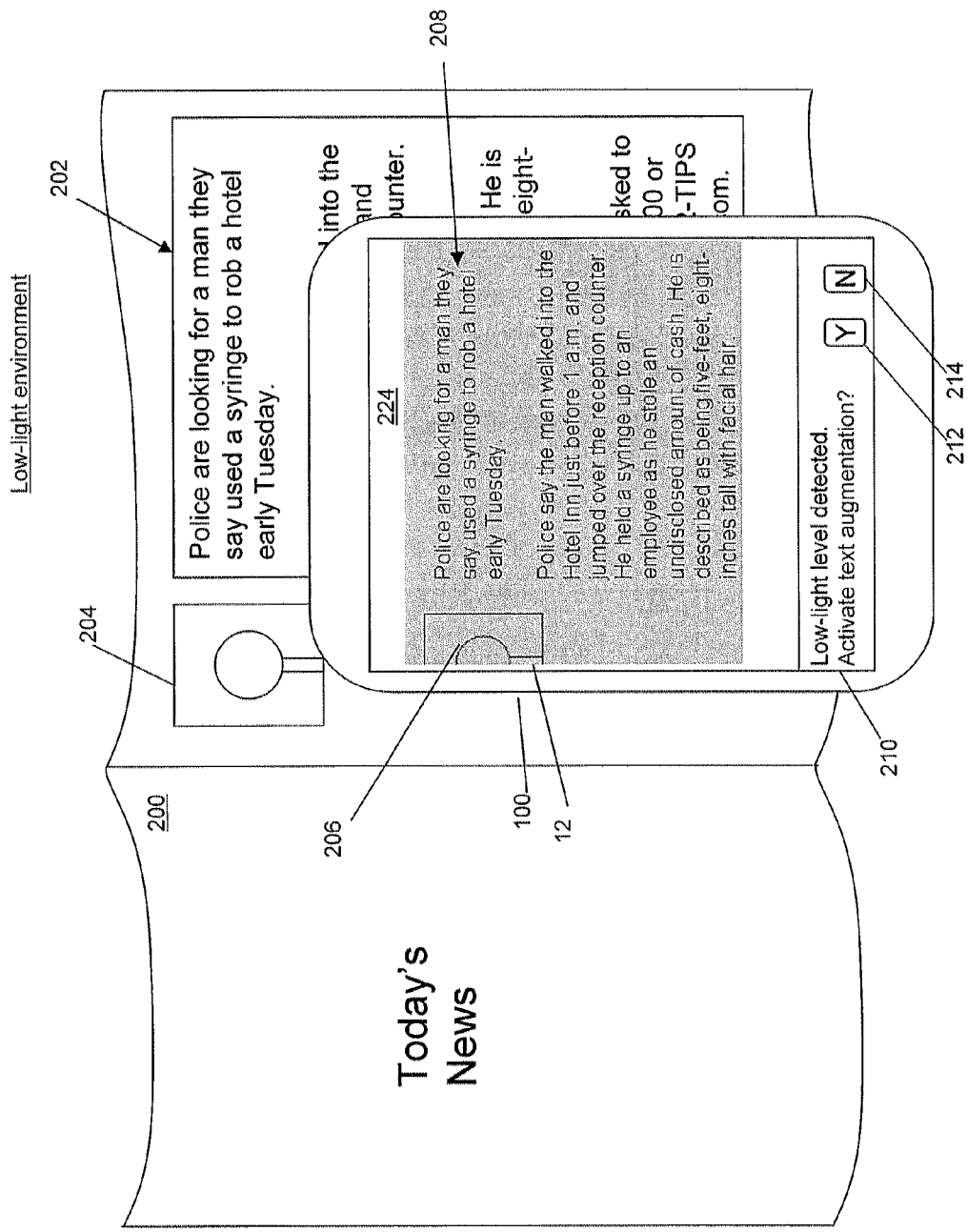
FIG. 1 a schematic diagram of a mobile device viewing text, displaying an image of the text, and displaying an indicator that low-lighting is detected.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In general, a system and a method are provided for displaying text in low-light environments. An original image of text is captured in a low-light environment using a camera on a mobile device, whereby the imaged text comprises images of characters. A brightness setting and a contrast setting of the original image are adjusted to increase the contrast of the imaged text relative to a background of the original image. Optical character recognition is applied to the adjusted image to generate computer readable text or characters corresponding to the imaged text. The original image of text is displayed on the mobile device. The computer readable text is also displayed, overlaid the original image.

In another aspect, the computer readable text is aligned with the corresponding imaged text. In another aspect, upon capturing the original image of text, the low-light environment is detected from the original image. In another aspect, the computer readable text is displayed in at least one of: a larger font than the imaged text; a different font than the imaged text; a different color than the imaged text; a bold font; an underlined font; and a highlighted font. In another aspect, text recognition is applied to the computer readable text to extract at least words from the computer readable text. In another aspect, at least one function is associated with at least one of the words. In another aspect, the at least one function is initiated by receiving a user input in association with the at least one word. In another aspect, the at least one function associated with a given word comprises at least one of: retrieving a definition of the given word; retrieving a synonym or an antonym of the given word; searching for documents in a documents database using the given word as a search parameter; using the given word as a keyword parameter in a world wide web search engine; and providing an audio output pronouncing the given word. In another aspect, a language translator is applied to the extracted words to generate translated words. In another aspect, the translated words corresponding to the imaged text are displayed overlaid the original image.

Turning to FIG. 1, an example of such an augmented reality display is provided. A mobile device 100 is shown viewing a medium 200 (i.e. a communication that includes text, such as e.g. an e-mail, web-site, book, magazine, newspaper, advertisement, another display screen, or other) in a low-light environment, or in a dark environment. The medium 200 includes text 202 and a graphic 204, such as a photograph. The mobile device 100 uses a camera, such as a built-in camera, to view the medium 200 and display an image 224 on the mobile device's display screen 12. Since the image 224 corresponds with the medium 200, the image 224 includes the images of the graphic 206 and the text 208. The image 224 is considered to be a streaming video image that corresponds with what is currently being viewed by the mobile device's camera. In other words, if the mobile device 100 is moved over a different part of the text 202, then a different image of the different part of the text 202 will be displayed on the mobile device 100.

It can be appreciated that the low-light environment (such as e.g. at night time, in a dark room, on a bus at night, etc.) makes it difficult for a user to read the text 202 from the medium 200. Low-light environments may vary depending on the sensitivity of a person's eye. However, low-light environments are typically measured in candela or lux, or both. For example, environments having lighting levels below approximately 0.1 cd/m$^2$ or below approximately 1 lux are considered to be low-light environments. It can be understood that the original image 224 captured by the mobile device 100 does not clearly show the imaged text 208 due to the low-light conditions. Many camera devices are not able to properly image shapes, including text, in poor lighting conditions. In other words, camera images captured in low-lighting condition are considered to be of poor quality and features (e.g. shapes) in such images are difficult to recognize.

Continuing with FIG. 1, the mobile device 100 detects low-lighting conditions based on the captured image 224. The mobile device 100 displays a message 210 on the display 12 stating that low-light levels are detected, and poses a question as to whether or not text augmentation should be activated. Controls 212, 214 are displayed to receive inputs as to whether or not the text augmentation is to be activated.

Figure 2:
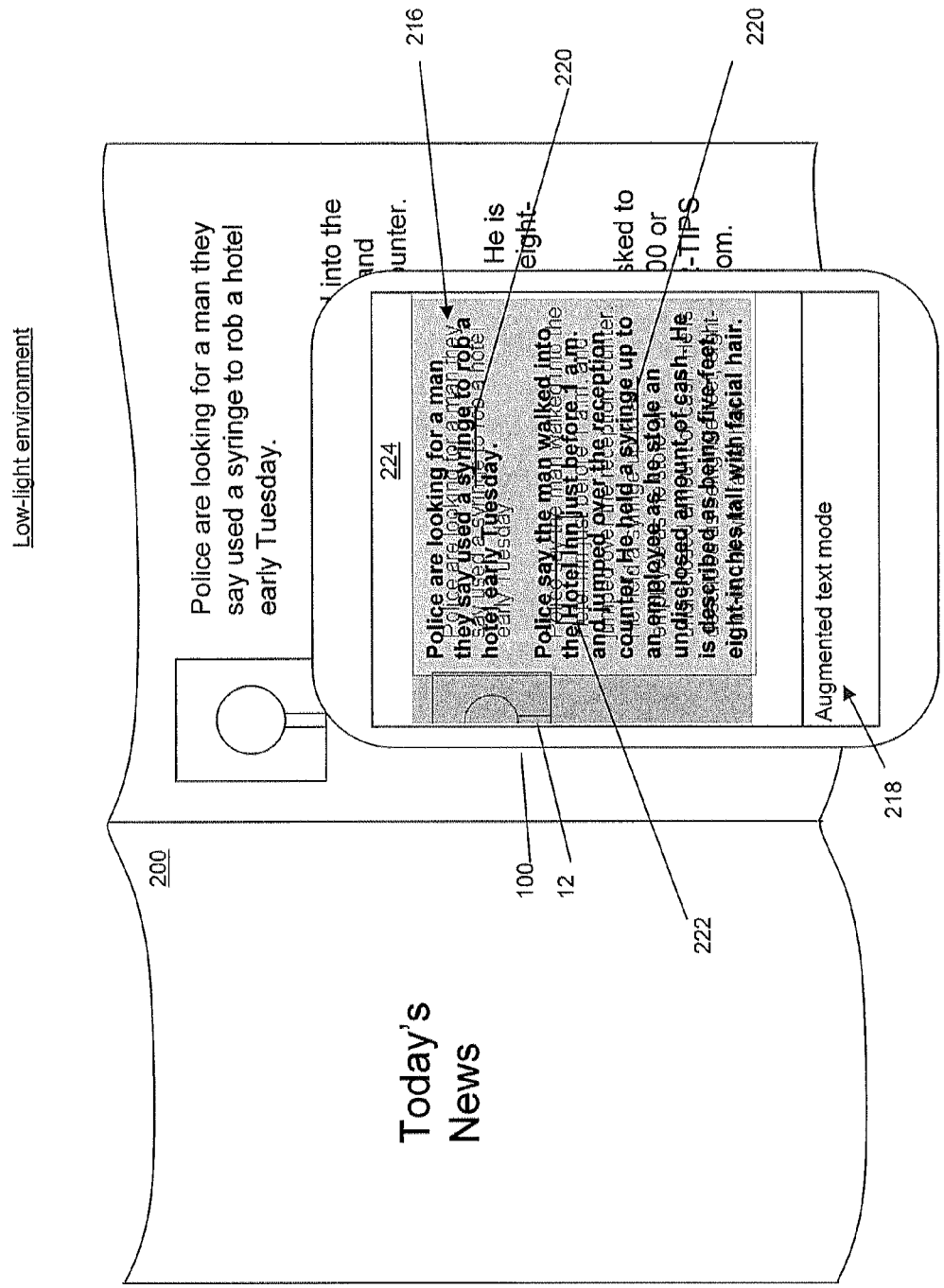
FIG. 2 is a schematic diagram of the mobile device in FIG. 1 augmenting the image with additional information.

Turning to FIG. 2, if the text augmentation is activated, a layer of computer readable text 216 is displayed on top of, or overlaid, the original image 224. The computer readable text 216 comprises the same characters or words as the imaged text 208, although the computer readable text 216 is displayed more clearly so that it can be easily viewed in low-lighting conditions. For example, the background of the computer readable text 216 can be brighter, and the computer readable text 216 itself can be darker. This provides contrast between the text and the background. In other examples, the computer readable text 216 can be displayed in larger font, in a brighter color, etc. The computer readable text 216 is also generally aligned with the imaged text 208, from which it corresponds. For example, the position of the imaged text 208 "Police are looking for a man . . . " on the display 12 and the position of the computer readable text 216 "Police are looking for a man . . . " are generally the same. This allows the mobile device 100 to augment the reality of the text on the medium 200 with enriched data (e.g. computer readable text 216). It can be appreciated that the imaged text 208 is an image and its meaning is not readily understood by a computing device or mobile device 100. By contrast, the computer readable text 216 is a visual representation of character codes that are understood by a computing device or mobile device 100, and can be more easily modified. Non-limiting examples of applicable character encoding and decoding schemes include ASCII code and Unicode. The words from the computer readable text can therefore be identified, as well as be underlined and associated with various functions. For example, the word "syringe" 220 in the computer readable text 216 is identified and underlined. The word or phrase "Hotel Inn" 222 is highlighted with a box. These words can be associated with other functions and turned into dynamic or active words, such as by making the words hyperlinks or controls. The display 12 also shows that the mobile device 100 is currently in augmented text mode 218.

As the mobile device 100 or the text 208 on the medium 200 move, the display 12 is automatically updated to show the text currently being viewed by the mobile device's camera. Accordingly, the computer readable text is also updated to correspond to the same currently imaged text.

It can therefore be seen that text can be viewed in low-light conditions on a mobile device 100 by displaying corresponding computer readable text in real-time. This augments the reality.

Examples of applicable electronic devices include pagers, cellular phones, cellular smart-phones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the principles described herein are also suitable to other devices, e.g. "non-mobile" devices.

In an embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 4:
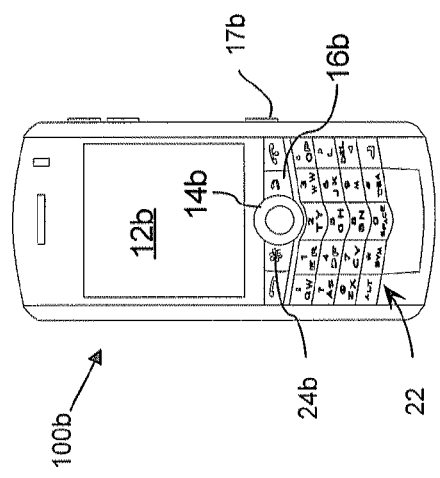
FIG. 4 is a plan view of another example mobile device and a display screen therefor.
Figure 3:
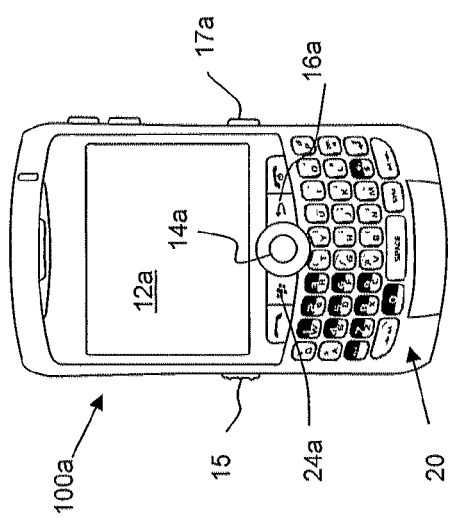
FIG. 3 is a plan view of an example mobile device and a display screen therefor.

Referring to FIGS. 3 and 4, one embodiment of a mobile device 100a is shown in FIG. 2, and another embodiment of a mobile device 100b is shown in FIG. 4. It will be appreciated that the numeral "100" will hereinafter refer to any mobile device 100, including the embodiments 100a and 100b, those embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 3 comprises a display 12a and the cursor or view positioning device 14 shown in this embodiment is a trackball 14a. Positioning device 14 may serve as another input member and is both rotational to provide selection inputs to the main processor 102 (see FIG. 6) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example situated on the front face of a housing for mobile device 100a as shown in FIG. 3 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 3 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo and video capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 4 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 4, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14b, escape button 16b and menu or option button 24 similar to that shown in FIG. 4 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 5:
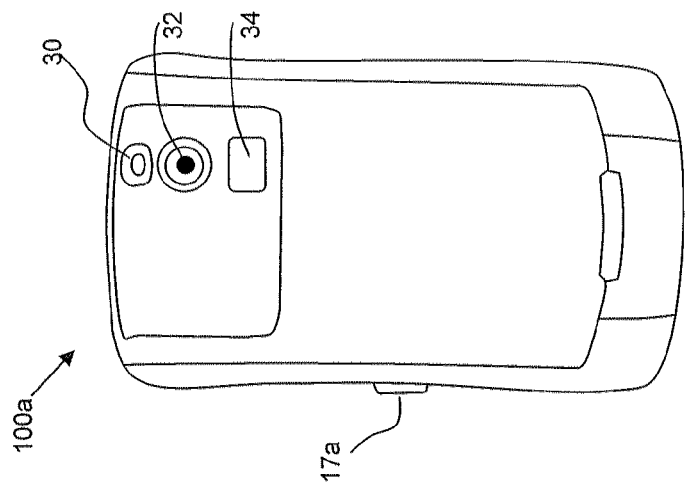
FIG. 5 is a plan view of the back face of the mobile device shown in FIG. 3, and a camera device therefor.

Referring to FIG. 5, in the rear portion of mobile device 100a, for example, there is a light source 30 which may be used to illuminate an object for taking capturing a video image or photo. Also situated on the mobile device's rear face is a camera lens 32 and a reflective surface 34. The camera lens 32 allows the light that represents an image to enter into the camera device. The reflective surface 34 displays an image that is representative of the camera device's view and assists, for example, a user to take a self-portrait photo. The camera device may be activated by pressing a camera button 17, such as the camera button 17a shown in FIG. 3.

To aid the reader in understanding the structure of the mobile device 100, reference will now be made to FIGS. 6 through 8.

Figure 6:
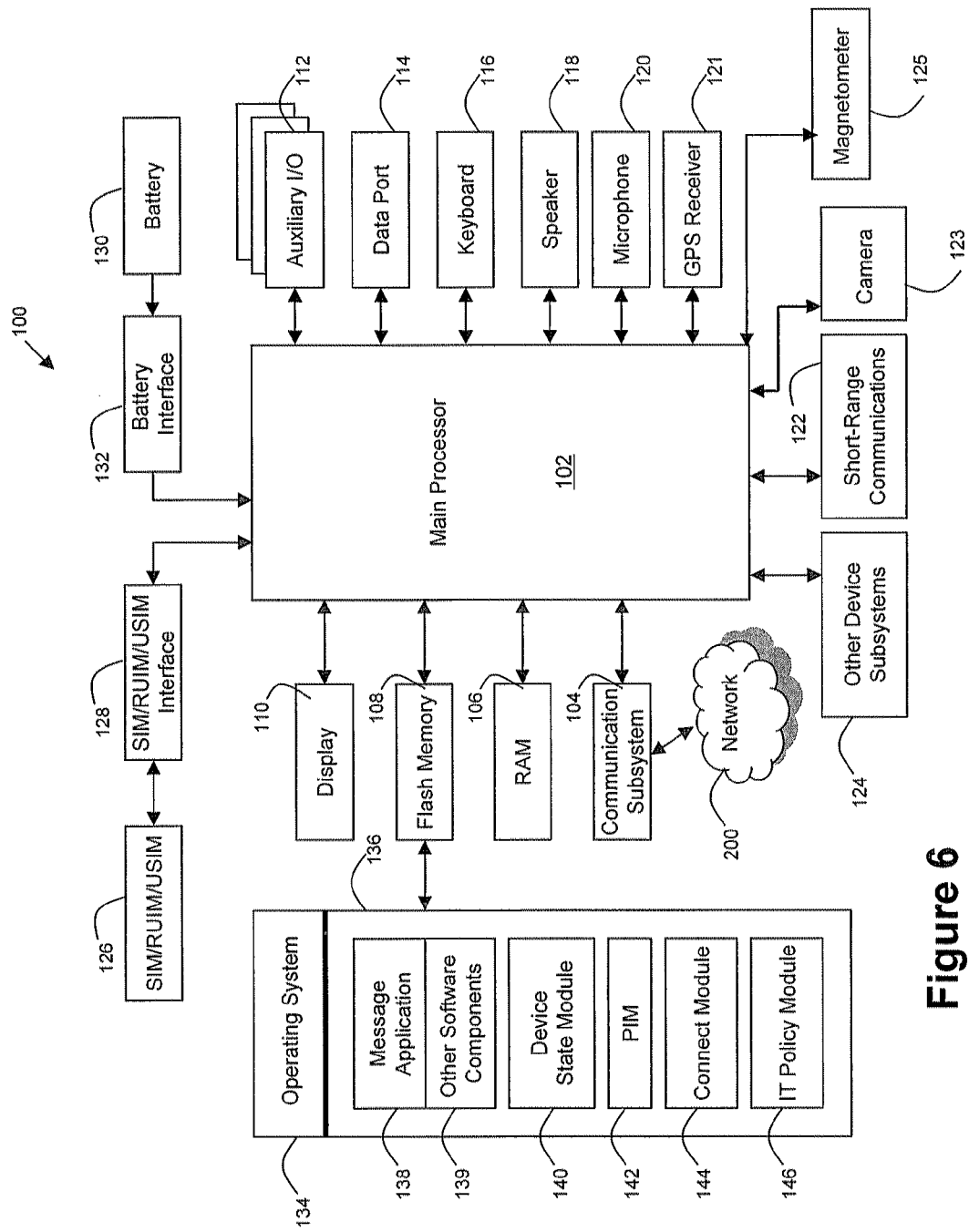
FIG. 6 is a block diagram of an example embodiment of a mobile device.

Referring first to FIG. 6, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a magnetometer 125, and other device subsystems 124. The display 110 can be a touch-screen display able to receive inputs through a user's touch.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 7:
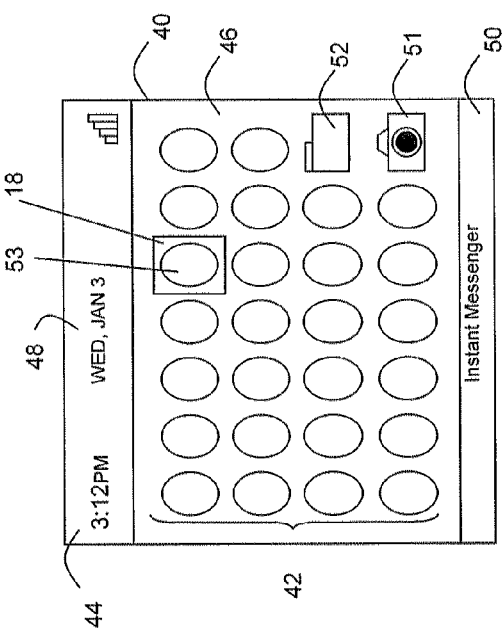
FIG. 7 is a screen shot of a home screen displayed by the mobile device.

Turning now to FIG. 7, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. An exemplary icon may be a camera icon 51 used to indicate an augmented reality camera-based application. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 7, and providing a selection input, e.g. by pressing the trackball 14b.

Figure 8:
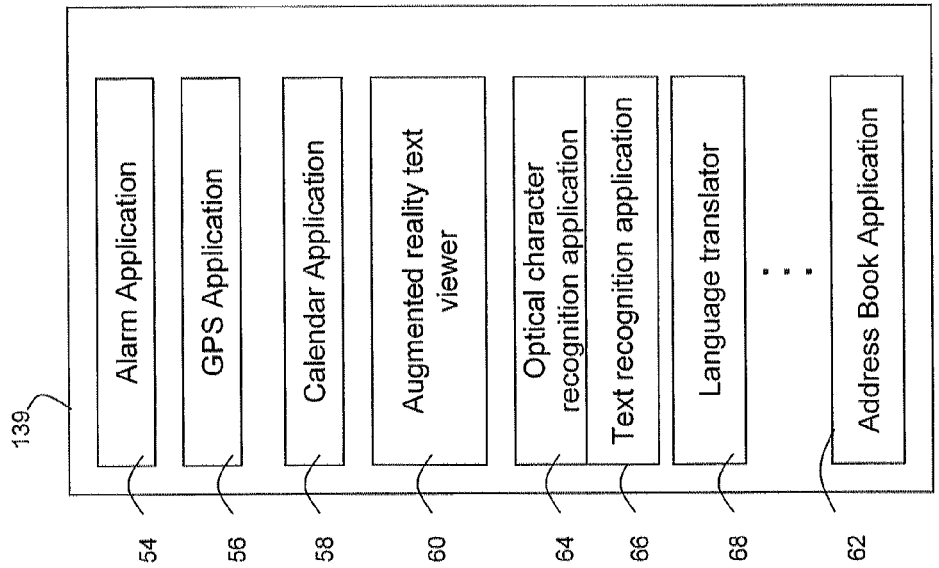
FIG. 8 is a block diagram illustrating exemplary ones of the other software applications and components shown in FIG. 6.

FIG. 8 shows an example of the other software applications and components 139 that may be stored and used on the mobile device 100. Only examples are shown in FIG. 8 and such examples are not to be considered exhaustive. In this example, an alarm application 54 may be used to activate an alarm at a time and date determined by the user. There is also an address book 62 that manages and displays contact information. A GPS application 56 may be used to determine the location of a mobile device 100. A calendar application 58 that may be used to organize appointments. Another exemplary application is an augmented reality text viewer application 60. This application 60 is able to augment an image by displaying another layer on top of the image, whereby the layer includes computer readable text corresponding to the text shown in the image.

Other applications include an optical character recognition application 64, a text recognition application 66, and a language translator 68. The optical character recognition application 64 and the text recognition application 66 may be a combined application or different application. It can also be appreciated that other applications or modules described herein can also be combined or operate separately. The optical character recognition application 64, also referred to as OCR, is able to translate handwritten text, printed text, typewritten text, etc. into computer readable text, or machine encoded text. Known methods of translating an image of text into computer readable text, generally referred to as OCR methods, can be used herein. The OCR application 64 is also able to perform intelligent character recognition (ICR) to also recognize handwritten text. The text recognition application 66 recognizes the combinations of computer readable characters that form words, phrases, sentences, paragraphs, addresses, phone numbers, dates, etc. In other words, the meanings of the combinations of letters can be understood. Known text recognition software is applicable to the principles described herein. A language translator 68 translates the computer readable text from a given language to another language (e.g. English to French, French to German, Chinese to English, Spanish to German, etc.). Known language translators can be used.

Figure 9:
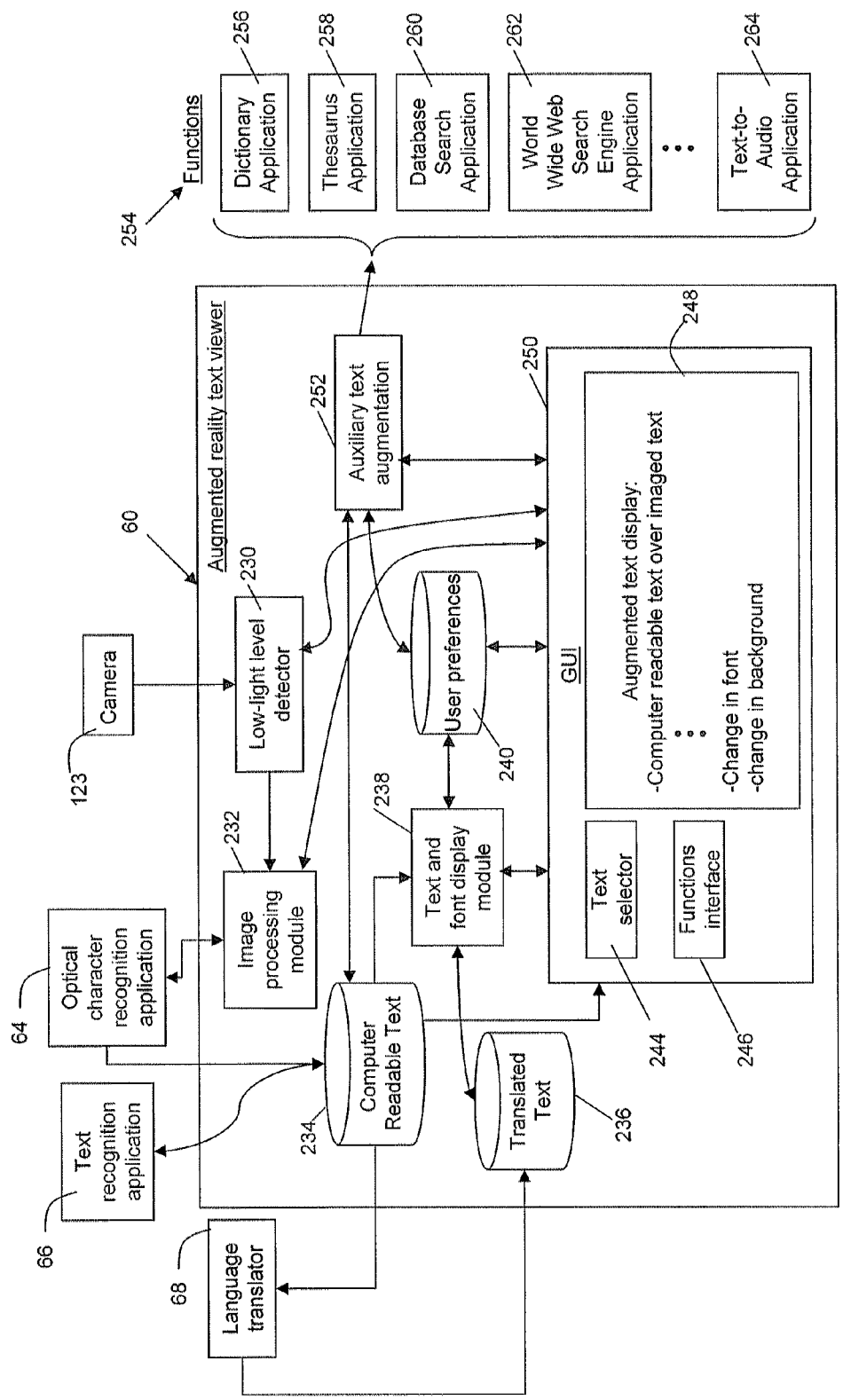
FIG. 9 is a block diagram of an example configuration of an augmented reality text viewer.

Turning to FIG. 9, an example configuration of the augmented reality text viewer 60 is provided. The augmented reality text viewer 60 receives an input from the camera 123. In particular, the augmented reality text viewer 60, or AR text viewer, receives camera or video images containing text.

Using the images, the AR text viewer 60 displays the image on the display screen 12 as well as displays computer readable text above the image.

Continuing with FIG. 9, the AR text viewer 60 includes a low-light level detector 230, an image processing module 232, computer readable text memory 234, translated text memory 236, a text and font display module 238, user preferences memory 240, an auxiliary text augmentation module 252, and a graphical user interface (GUI) 250. The AR text viewer 60 can also include or interact with the OCR application 64, the text recognition application 66, the language translator 68, and a number of other functions 254 that are able to interact with the computer readable text.

In particular, the camera 123 provides streaming images of text which are captured in low-light conditions. The low-light level detector 230 receives the images from the camera 123. If the received images appear dark, or have low contrast between the objects (e.g. text) and the background, then the low-light level detector 230 can automatically activate the AR text viewer 60. Alternatively, the low-light level detector 230 can display, through the GUI 250, a message on the mobile device's display screen 12 stating that a low-light environment is detected, and provide controls allowing a user to activate the AR text viewer 60. It can be appreciated that known techniques for detecting low-light using a charged-coupled device (CCD) or images captured by a camera can also be used. Upon activating the AR text viewer 60, the original image viewed from the camera 123 undergoes image processing by the image processing module 232. The brightness settings and contrast settings of the image are adjusted by module 232 to increase the definition of the imaged text. Alternatively, or additionally, the exposure settings of the camera 123 may be increased so that more light is absorbed by the camera. It is noted that without image processing, the text from the original image would not likely be properly recognized by an OCR application 64 due to the poor image quality from the low-light conditions. The adjusted image is then processed by the OCR application 64 to translate the more clearly defined imaged text into computer readable text. The computer readable text generated by the OCR application 64 is saved to memory 234. The computer readable text also is processed by a text recognition application 66 to identify words, phrases, phone numbers, addresses, web addresses, etc., which are also saved in memory 234. The computer readable text can then be displayed on the screen 12, through the GUI 250. The text and font display module 238 can control or manipulate the display of the computer readable text, such as by controlling the font style, font size, font color, highlighting, underlines, hyperlinks, etc. The computer readable text is displayed in way so that is easily read in low-light conditions. A user can provide preferences, stored in memory 240, to the text and font display module 238, which can be used to select display settings for the computer readable text. A language translator 68 can translate the computer readable text 234 into different languages and the translated text is saved in memory 236. The display of the translated text can also be modified or controlled by the text and font display module 238.

The GUI 250 includes a text selector 244 allowing a user to select text, a functions interface 246 for facilitating interaction with various functions related to the text, and an augmented text display 248 for displaying computer readable text over the imaged text, among others. The augmented text display 248 also interacts with the image processing module 232 to determine the location (e.g. pixel location) of the imaged text in the original image and to generally align the location of the corresponding computer readable text over the imaged text.

Other functions 254 can be performed to augment the display of text through the auxiliary text augmentation module 252. Examples of such functions 254 include a dictionary application 256 for defining words, a thesaurus application 258 for providing synonyms and antonyms, a database search application 260 for searching databases (e.g. for documents, photos, files, etc.), a world wide web search engine application 262 (e.g. Google™ or Bing™) for performing keyword based web searching, and a text-to-audio application 264 for translating text to speech.

In an example embodiment, a user can select several words which can be translated to speech. In another example, a word can be selected and used as a search term in a database or on the world wide web. User preferences may also be associated with such functions.

Turning to FIG. 10, examples of user preferences 240 for displaying computer readable text and associating functions with the text are provided. Preferences may include a list of words to highlight 270, a list of words to bold 278, and a list of words to underline 276. For example, a user may be interested in looking for certain words in a document, and may use the AR text viewer 60 to bring these certain words to the user's attention by highlighting, underlining or bolding the computer readable text laid over the imaged text. Other preferences include calling on a list of words to automatically define 272. Such a list 272, for example, can be obtained from a dictionary of uncommon words, where the definitions are not likely to be known. There may also be a list of preferred fonts 274 for displaying the computer readable text in, for example, Arial font, Times New Roman font, Bank Gothic font, Freestyle script font, etc. There may also be a preferred font size 282 that is used when the AR text viewer is in a magnification mode. There may also be a list of words to automatically hyperlink to a world wide web search engine 280. For example, the user may be interested in companies and every time a company name is detected in the computer readable text, an internet search for the company name is initiated.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Turning to FIG. 11, example computer executable instructions are provided for displaying text in low-light environments. At block 284, the mobile device 100 captures an original image of text in a low-light environment using a camera 123 on the mobile device 100. The imaged text includes images of characters (e.g. letters, punctuation, numbers, etc.). At block 286, the brightness setting and contrast setting of the original image are adjusted to increase the contrast of the imaged text relative to a background of the original image. The background can be considered the area behind the imaged text. At block 288, optical character recognition is applied to the adjusted image to generate computer readable characters or text corresponding to each of the images of the characters. At block 290, the original image of the text is displayed on the mobile device 100. At block 292, the computer readable characters are displayed, overlaid the original image. The computer readable characters are generally aligned with the corresponding images of the characters. At block 294, the mobile device 100 continuously captures images of the text and automatically updates the display when the position of the text changes, or if new text is detected. The process repeats by implementing the operations in blocks 286, 288, 290, 292, and 294, which is represented by the dotted line 296.

Figure 12:
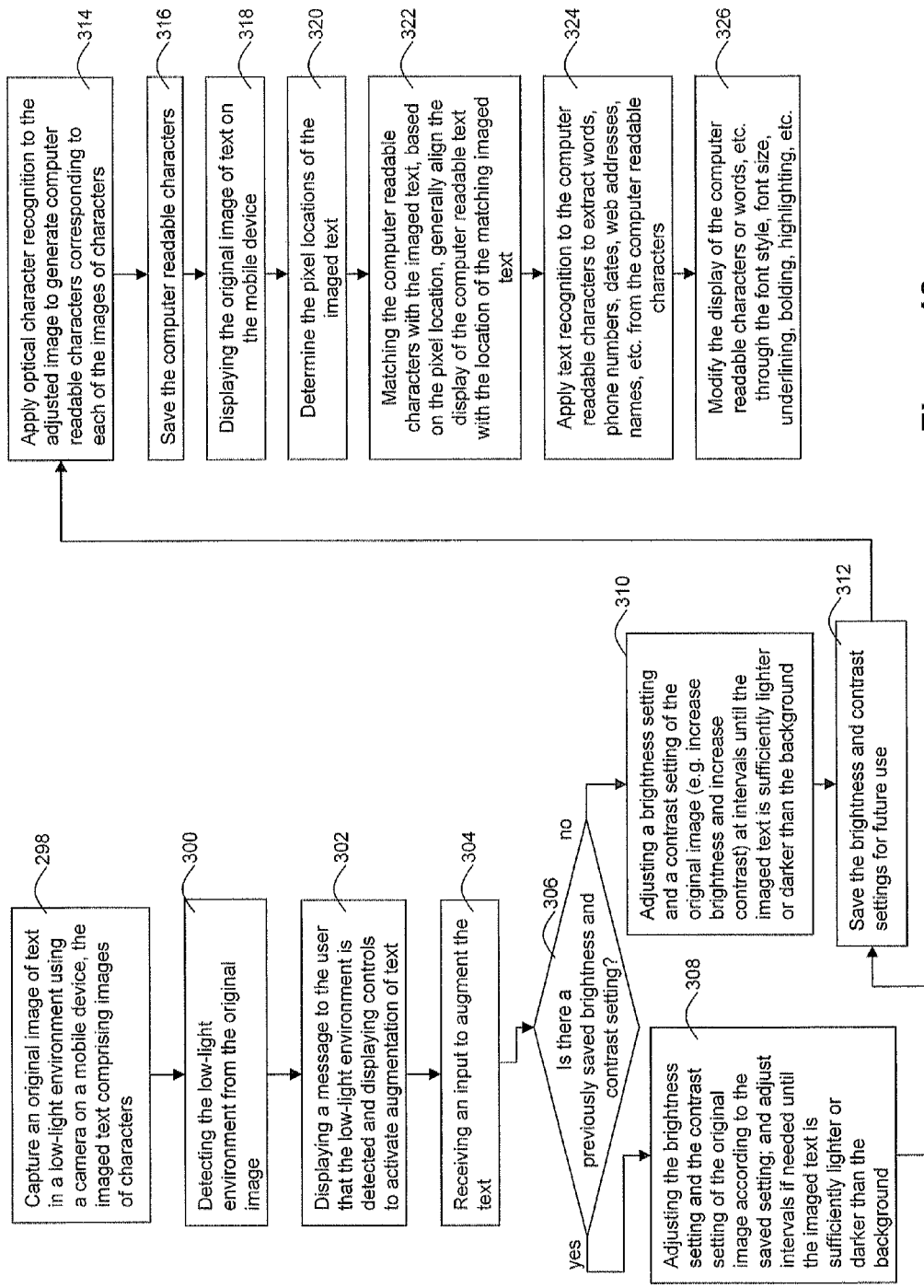
FIG. 12 is a flow diagram of further example computer executable instructions for displaying text in low-light environments.

FIG. 12 provides further example computer executable instructions for augmenting the display of text in low-light conditions. At block 298, an original image of text is captured in a low-light environment using a camera on a mobile device 100. The imaged text can comprise images of characters. At block 300, the low-light environment is detected based on the original image. At block 302, a message is displayed to the user that the low-light environment is detected and controls are displayed to activate the augmentation of the imaged text. At block 304, an input is received to augment the text. At block 306, it is determined if there is a previously saved image processing setting (e.g. a brightness setting, a contrast setting, a sharpness setting, a brightness-to-contrast ratio setting, etc.). If a previous image processing setting is available, then at block 308 the brightness and contrast settings of the original image are adjusted to the previously saved settings. If further adjustment is required, then the image is adjusted at intervals until the imaged text is sufficiently recognizable to the OCR application 64. For example, the imaged text is recognizable if it is sufficiently darker or lighter relative to the background. If the further adjustment is required, then the new image settings are saved for future use (block 312). It is recognized that the lighting conditions of the text do not change significantly within most periods of use. Therefore, the previous image adjustment settings can be used. It can be appreciated that saving the image adjustment settings allows the mobile device 100 to process the images of text quickly, facilitating the real-time augmented reality performance. However, if there are no previously saved settings, then at block 310, the brightness and contrast settings are adjusted. Usually, due to low-light environments, the brightness and contrast of the originally captured image will need to be increased. There may also be known optimal brightness-to-contrast settings based on the given low-light conditions. The settings can be increased at intervals until the imaged text is sufficiently lighter or darker than the background. The settings are then saved for future used (block 312).

At block 314, optical character recognition is applied to the adjusted image to generate computer readable text or characters corresponding to the imaged text. As described earlier, methods and approaches for optical character recognition are known and can be applied to the principles herein. At block 316, the computer readable text or characters are saved. At block 318, the original image of text is displayed on the mobile device 100. At block 320, the pixel locations of the imaged text are determined. At block 322, the computer readable text or characters are matched with the imaged text using the pixel locations. The locations of the matching computer readable text or characters are aligned with the locations of the imaged text on the display screen 12. In this way, the computer readable text is overlaid the imaged text in an aligned manner. The computer readable text may not necessarily be aligned however. For example, a translucent layer can cover the imaged text portion to at least partially block out the imaged text, and the computer readable text can be displayed on top of the translucent layer. It can be appreciated that there are different ways of displaying the computer readable text.

Continuing with FIG. 12, at block 324, text recognition is applied to the computer readable text or characters to extract words, phone numbers, web addresses, dates, names, etc. At block 326, the display of the computer readable characters, words, text, numbers, etc. is modified by adjusting the font style, font size, underlining, bolding, highlighting, etc.

Figure 13:
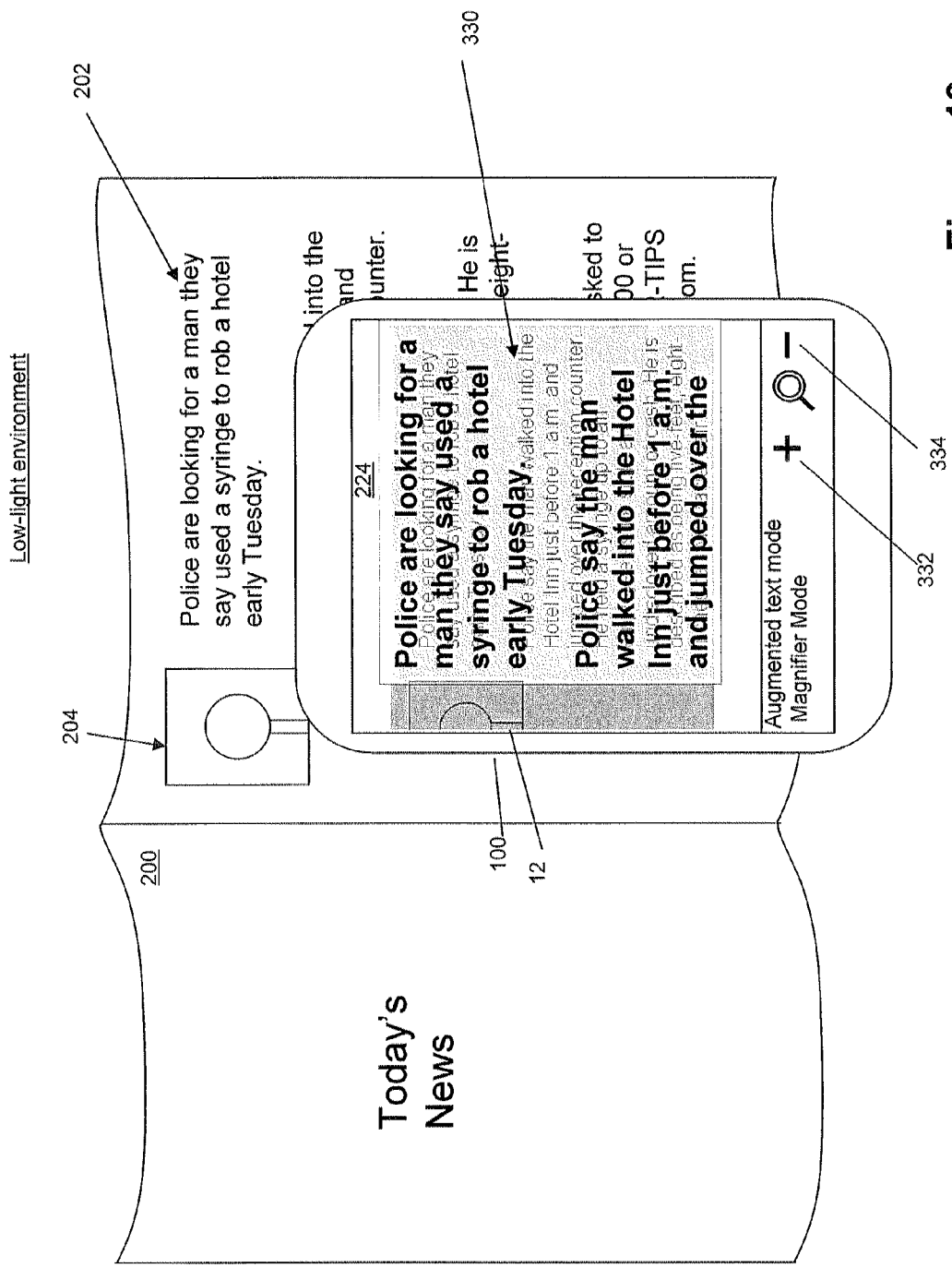
FIG. 13 is a schematic diagram of a mobile device displaying an augmentation of the imaged text in magnification mode.
Figure 14:
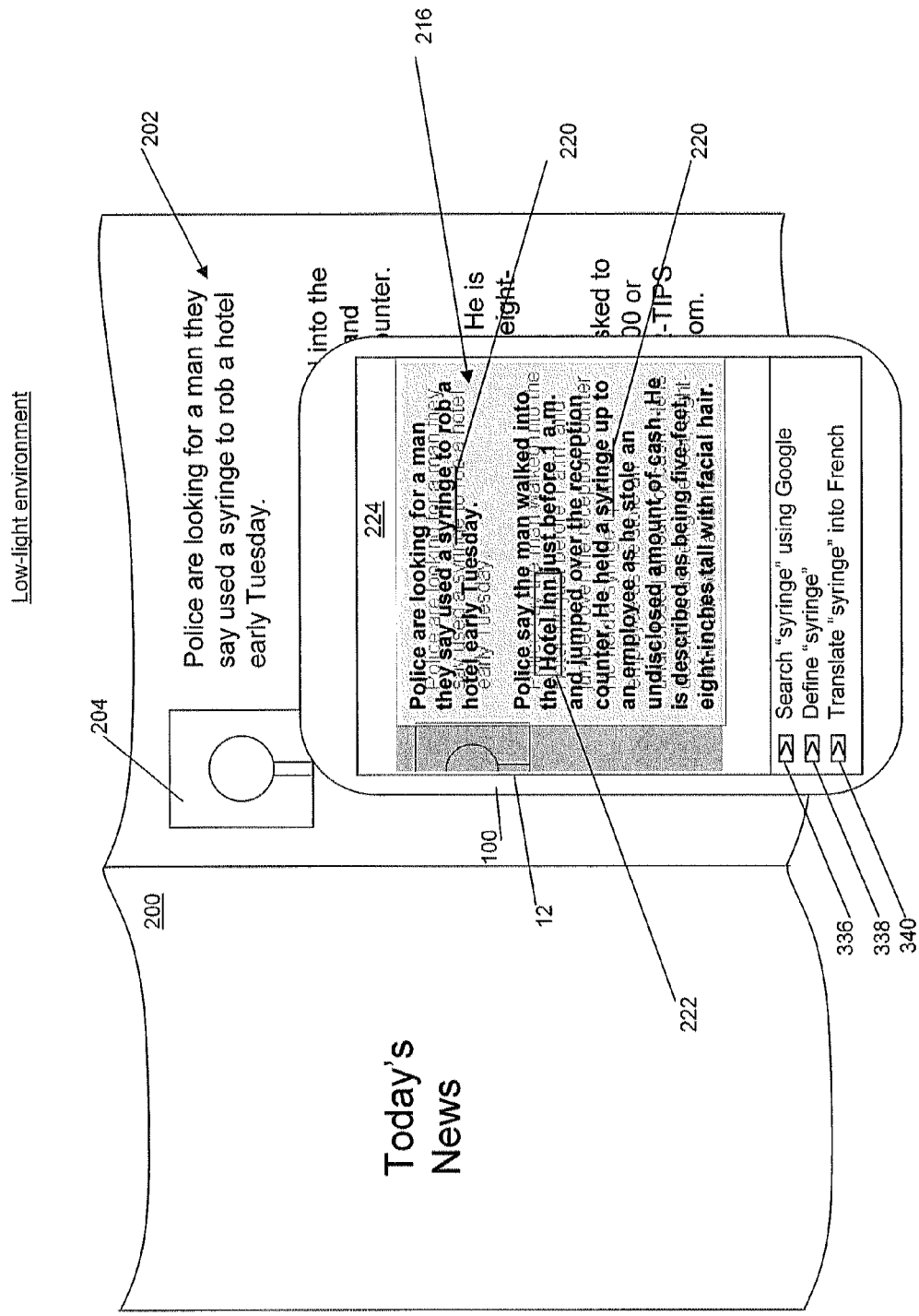
FIG. 14 is a schematic diagram of a mobile device displaying an augmentation of the imaged text including options to search, define, and translate selected words.
Figure 15:
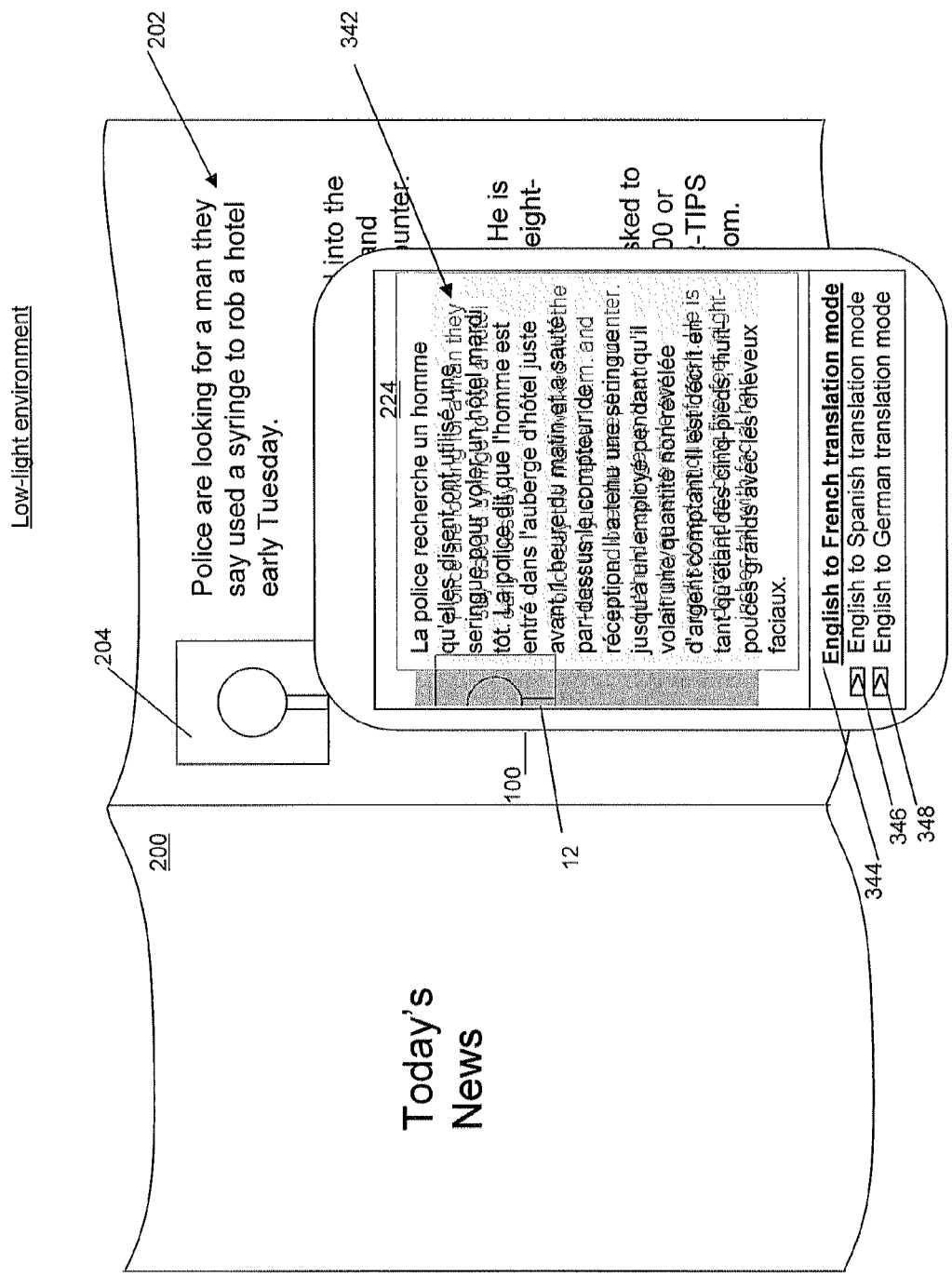
FIG. 15 is a schematic diagram of a mobile device displaying an augmentation of the imaged text in an English to French translation mode, as well as options for other language translations.

FIGS. 13, 14 and 15 show example screen shots of the AR text viewer. FIG. 13 shows the AR text viewer in magnification mode. The augmented layer of text 330 includes computer readable text that is of a larger font size than the imaged text. Controls 332 and 334 allow the font size of the computer readable text to increase or decrease, respectively.

FIG. 14 shows a screen shot including an augmented layer of computer readable text 215 including words that have been associated with functions. For example, after translating the imaged text to computer readable text, and identifying the word "syringe" from the computer readable text, instances of the word "syringe" 220 have been underlined. Instances of the name "Hotel Inn" 220 have also been identified, and highlighted with a box. Controls 336, 338, 340 for initiating functions that have been associated with the word "syringe" are also displayed. Control 336 initiates searching for the word "syringe" using a world wide web search engine. Control 338 initiates obtaining the definition of the word "syringe". Control 340 initiates translating the word "syringe" into French. It can be appreciated that a user can select another word, thereby associating functions with the selected word. Other controls for other functions can be displayed. It is also appreciated that the screen shots provided herein are just for example and other GUI configurations are applicable.

FIG. 15 shows a screen shot of the original image 224 containing images of English text and being augmented with translated French computer readable text 342. The mobile device 100 shows that it is currently in an English-to-French translation mode. Control 346 allows the mobile device 100 to switch modes to English to Spanish, and control 348 allows the mobile device 100 to switch modes to English to German. It can be appreciated that the computer readable text can be translated into many different languages and displayed over the originally imaged text.

Figure 16:
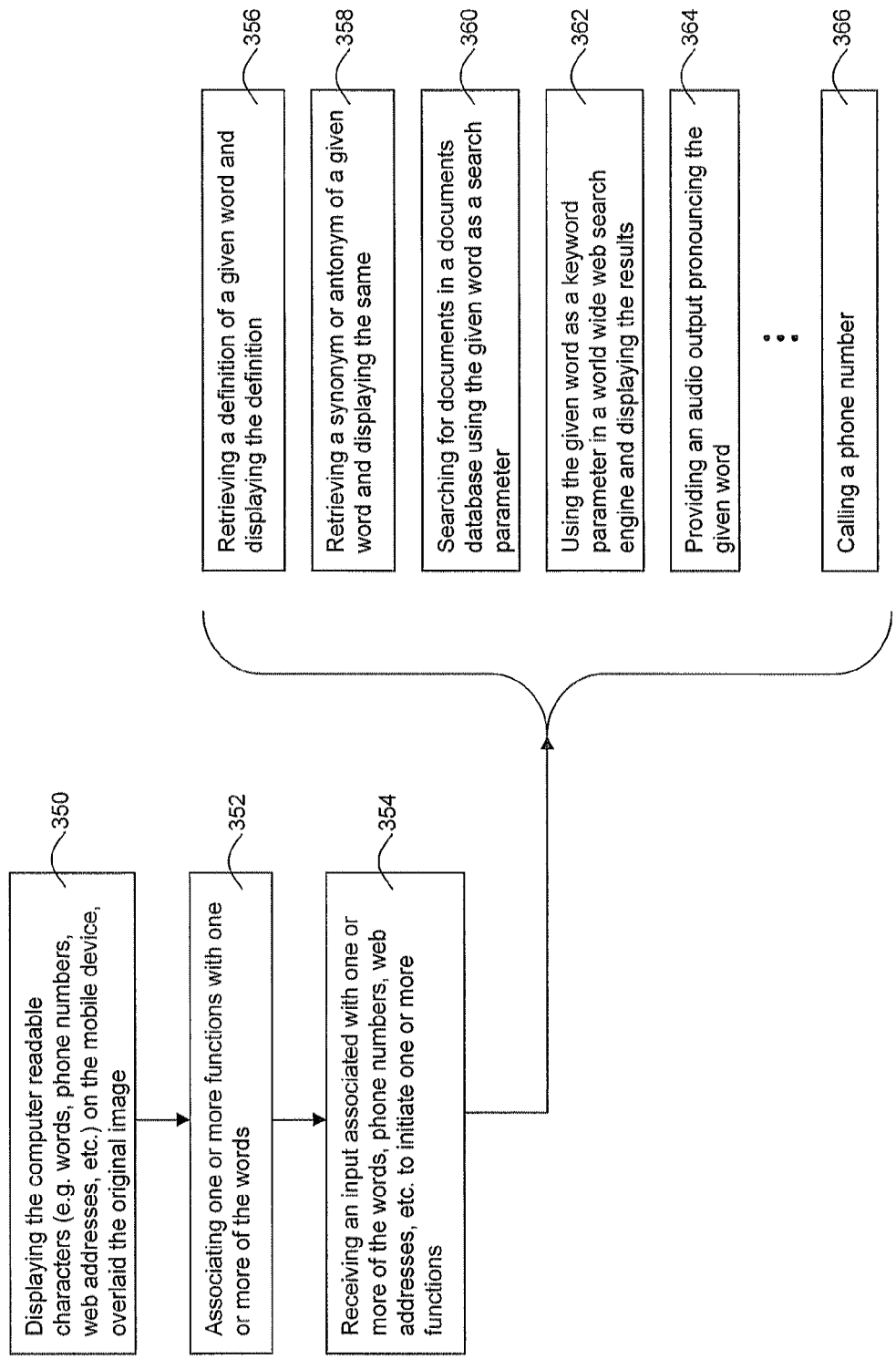
FIG. 16 is a flow diagram of example computer executable instructions for associating one or more functions with words extracted from the imaged text.

Turning to FIG. 16, example computer executable instructions are provided for associating functions with words. At block 350, the computer readable characters or text, such as words, phone numbers, web addresses, etc. are displayed on the mobile device 100, overlaid the original image. One or more functions are associated with one or more of the words (block 352), either automatically or manually. In other words, certain words all words can be associated with a function, for example, as determined by user preferences. Alternatively, words can be manually associated with a function. For example, a user can select a word in the computer readable text and associate it with an speech output. At block 354, an input for initiating one or more functions associated with or more of the words, phone numbers, web addresses, etc. is received. The function or functions are then initiated.

Continuing with FIG. 16, examples of initiating functions include: retrieving a definition of a given word and displaying the definition (block 356); retrieving a synonym or antonym of a given words and displaying the same (block 358); searching for documents in a documents database using the given words as a search parameter (block 360); using the given words as a keyword parameters in a world wide web search engine and displaying the results (block 362); providing an audio output pronouncing the given word (block 364); and calling a phone number identified in the computer readable text (block 366). The above list of functions is non-exhaustive, and other functions related to the computer readable text are also applicable. It can also be appreciated that functions may transmit requests for information from the mobile device 100 to other mobile devices or computing devices (not shown). For example, when searching for documents, the request for data may be sent to a document server that performs the search and returns a search result to the mobile device 100. The mobile device 100 then displays the result from the document server.

It can therefore be seen that reading text in low-light conditions can be improved by using the AR text viewer to capture images of the text and clearly display computer readable text over the captured images. Other benefits include using the AR text viewer to magnify text that is difficult to read because it is too small, and using the AR text viewer to translate text that is in another language.

The schematics and block diagrams used herein are just for example. Different configurations and names of components can be used. For instance, components and modules can be added, deleted, modified, or arranged with differing connections without departing from the spirit of the invention or inventions.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A method of displaying text in low-light environments, the method comprising:
   capturing a streaming video comprising an original image of text in a low-light environment using a camera on a mobile device;
   adjusting a brightness setting and a contrast setting of the original image to increase the contrast of the imaged text relative to a background of the original image;
   applying optical character recognition to the adjusted image to generate text corresponding to the imaged text;
   displaying the original image of text on the mobile device;
   displaying, overlaid the original image, the text with greater visibility in the low-light environment than the imaged text;
   automatically updating the display of the text when the position of the corresponding imaged text changes location in a subsequent original image of the streaming video; and,
   when new imaged text is detected in the subsequent original image, automatically updating the display with new text overlaid the corresponding new imaged text.

2. The method of claim 1 wherein the text is aligned with the corresponding imaged text.

3. The method of claim 1 further comprising, upon capturing the original image of text, detecting the low-light environment from the original image.

4. The method of claim 1 wherein the text is displayed in at least one of: a larger font than the imaged text; a different font than the imaged text; a different color than the imaged text, a greater contrast to the background of the original image than the imaged text, a bold font; an underlined font; and a highlighted font.

5. The method of claim 1 further comprising applying text recognition to the text to extract at least words from the text.

6. The method of claim 5 further comprising associating at least one function with at least one of the words.

7. The method of claim 6 wherein the at least one function is initiated by receiving a user input in association with the at least one word.

8. The method of claim 7 wherein the at least one function associated with a given word comprises at least one of: retrieving a definition of the given word; retrieving a synonym or an antonym of the given word; searching for documents in a documents database using the given word as a search parameter; using the given word as a keyword parameter in a world wide web search engine; and providing an audio output pronouncing the given word.

9. The method of claim 5 further comprising applying a language translator to the extracted words to generate translated words.

10. The method of claim 9 further comprising displaying, overlaid the original image, the translated words corresponding to the imaged text.

11. A mobile device, comprising:
    a display;
    a camera configured to capture a streaming video comprising an original image of text in a low-light environment; and
    a processor connected to the display and the camera, and configured to adjust a brightness setting and a contrast setting of the original image to increase the contrast of the imaged text relative to a background of the original image, apply optical character recognition to the adjusted image to generate text corresponding to the imaged text, display on the display the original image of text with the text overlaid the original image, the text being displayed with greater visibility in the low-light environment than the imaged text, and automatically update the display of the text when the position of the corresponding imaged text changes location in a subsequent original image of the streaming video, and, when new imaged text is detected in the subsequent original image, automatically update the display with new text overlaid the corresponding new imaged text.

12. The mobile device of claim 11 wherein the text is aligned with the corresponding imaged text.

13. The mobile device of claim 11 wherein upon capturing the original image of text, the processor is further configured to detect the low-light environment from the original image.

14. The mobile device of claim 11 wherein the text is displayed in at least one of: a larger font than the imaged text; a different font than the imaged text; a different color than the imaged text; a greater contrast to the background of the original image than the imaged text; a bold font; an underlined font; and a highlighted font.

15. The mobile device of claim 11 wherein the processor is further configured to apply text recognition to the text to extract at least words from the text.

16. The mobile device of claim 15 wherein the processor is further configured to associate at least one function with at least one of the words.

17. The mobile device of claim 16 wherein the at least one function is initiated by receiving a user input in association with the at least one word.

18. The mobile device of claim 17 wherein the at least one function associated with a given word comprises at least one of: retrieving a definition of the given word; retrieving a synonym or an antonym of the given word; searching for documents in a documents database using the given word as a search parameter; using the given word as a keyword parameter in a world wide web search engine; and providing an audio output pronouncing the given word.

19. The mobile device of claim 15 wherein the processor is further configured to apply a language translator to the extracted words to generate translated words.

20. The mobile device of claim 19 wherein the processor is further configured to display, overlaid the original image, the translated words corresponding to the imaged text.

21. The method of claim 1 wherein the text is computer readable text.

22. The mobile device of claim 11 wherein the text is computer readable text.

* * * * *